United States Patent [19]
Nielsen et al.

[11] Patent Number: 5,797,259
[45] Date of Patent: Aug. 25, 1998

[54] COOLING AIR COOLER FOR POWER PLANTS

[75] Inventors: Henrik Nielsen, Wettingen; Christoph Ruchti, Uster, both of Switzerland

[73] Assignee: Asea Brown Boveri AG, Baden, Switzerland

[21] Appl. No.: 725,230

[22] Filed: Oct. 3, 1996

[30] Foreign Application Priority Data

Nov. 10, 1995 [DE] Germany ................. 195 41 914.6

[51] Int. Cl.[6] .................... F02C 6/18; F02C 7/141
[52] U.S. Cl. .............. 60/39.182; 60/39.53; 60/728
[58] Field of Search ............... 60/39.07, 39.182, 60/39.54, 39.58, 39.59, 39.75, 39.83, 728, 39.53, 39.55

[56] References Cited

U.S. PATENT DOCUMENTS

| | | |
|---|---|---|
| 4,767,259 | 8/1988 | Kurosawa et al. |
| 4,852,344 | 8/1989 | Warner. |
| 4,991,391 | 2/1991 | Kosinski ............ 60/39.182 |
| 5,233,823 | 8/1993 | Day ................... 60/39.59 |
| 5,491,971 | 2/1996 | Tomlinson et al. ... 60/39.182 |

FOREIGN PATENT DOCUMENTS

| | | |
|---|---|---|
| 0519304A1 | 12/1992 | European Pat. Off. |
| 4333439C1 | 2/1995 | Germany. |
| 4434526C1 | 4/1996 | Germany. |
| WO95/11376 | 4/1995 | WIPO. |

OTHER PUBLICATIONS

"Das neue Dampferzeugersystem für das französische Kernkraftwerk EL-4", O. Profos, Technische Rundschau Sulzer, Feb. 1970, pp.69–83.

Primary Examiner—Louis J. Casaregola
Attorney, Agent, or Firm—Burns, Doane, Swecker & Mathis, L.L.P.

[57] ABSTRACT

The cooling air cooler (10) for power plants of combined operation is designed as a helix steam generator which works on the countercurrent principle and is located in a vertically arranged cylindrical pressure vessel (23) and the spirally coiled tubes (30) of which fill the space between an inner (26) and an outer (41) jacket tube, water (12) being capable of being supplied to the tubes (30) via a conduit (32) and steam (14) being capable of being discharged from the tubes (30) via a conduit (33), the evaporating water (12) flowing through the helix from the bottom upward and the cooling air (11), capable of being supplied by the compressor (1) via an inflow conduit (24), flowing through the helix from the top downward, and the air (11) experiencing deflection before reaching an outflow conduit (25) at the lowest point in the pressure vessel (23) after flowing out of the helix. When the power plant is operating normally, the steam (14) generated in the cooling air cooler (10) is guided to the steam turbine (17) via the waste-heat boiler (15). For operating situations where the gas turbine works alone, water injection into the air (11) to be cooled or a supply of the steam (14) generated in the cooler (10) into the cooled air (13) is provided.

8 Claims, 8 Drawing Sheets

COOLING AIR COOLER FOR POWER PLANTS

BACKGROUND OF THE INVENTION

1. Field of the invention

The invention relates to a cooling air cooler which is integrated into a power plant and which converts compressed or precompressed air from the compressor unit into cooling air for the cooling of thermally loaded assemblies of the power plant.

2. Discussion of Background

In single-cycle gas turbine plants, it has hitherto been conventional to cool the compressed or precompressed air recovered from the compressor by means of water injection or external cooling before said air is supplied as cooling air to the cooling system of the turbine. In this case, this heat is largely lost from the system as a whole.

In contrast, in combination plants, as is known, water cooling of the air in an air/water heat exchanger is usually carried out and the heat coming from the cooling air cooler reutilized in the power plant. By means of feed pumps, the pressure on the water side is raised above the saturated steam pressure to avoid evaporation, and the water heated up in the cooler is subsequently expanded in a low-pressure system, in which it can evaporate. In a modified solution, the heat exchanger is operated in parallel with an economizer of a waste-heat steam generator located downstream of the gas turbine group. In both cases, high system pressures have to be adopted on account of the high cooling air temperatures and the sharply varying heat quantities. This results in corresponding losses. Moreover, for the purpose of controlling transient operating conditions, such as the startup and rundown of the plant, particularly in cases in which a waste-heat steam generator is used, it is necessary to provide complex control circuits which make the plant more expensive and, furthermore, reduce the efficiency of the plant.

The applicant also knows of a power plant, into which a cooling air cooler designed as a forced-flow heater is integrated. Simpler regulation and higher efficiency in comparison with the abovementioned solutions are thereby achieved.

On the other hand, so-called helix steam generators are known (see O. Profos: "Das neue Dampferzeugersystem für das französische Kernkraftwerk EL-4" ["The new steam generator system for the French nuclear power station EL-4"], Technische Rundschau Sulzer, 2, 1970, p. 69–83). These are single-tube steam generators which consist essentially of a bundle of helically coiled smooth tubes wound compactly one in the other, said bundle being arranged in a pressure vessel, of the two closing covers and of the associated water and steam conduit leadthroughs. The heating surface is formed by the helical tubes (helix tubes) wound one in the other. Each tube is guided continuously from the bottom upward, so that steam generation takes place in parallel individual strands. The water/steam stream flows from the bottom upward, whilst the heated gas is guided in countercurrent from the top downward. The use of helix steam generator of this type as a cooling air cooler for a power plant, in particular a combination plant, has not been known hitherto.

SUMMARY OF THE INVENTION

The invention commences here. Accordingly, one object of the invention is to provide a novel cooling air cooler for a power plant, said cooling air cooler working simply and reliably in the operating range between 5 and 100% of cooling capacity and guaranteeing a high efficiency of the plant as a whole. The cooling capacity is to be used at the same time for the production of steam.

According to the invention, in a cooling air cooler for power plants according to the preamble of patent claim 1, this is achieved in that the cooling air cooler is a helix steam generator which works on the countercurrent principle and is located in a vertically arranged cylindrical pressure vessel and the spirally coiled tubes of which fill the space between an inner and an outer jacket tube, water being capable of being supplied to the tubes via a conduit and steam being capable of being discharged from the tubes via a conduit, the evaporating water flowing through the helix from the bottom upward and the cooling air, capable of being supplied by the compressor via an inflow conduit, flowing through the helix from the top downward, and the air experiencing deflection before reaching an outflow conduit at the lowest point in the pressure vessel after flowing out of the helix.

The advantages of the invention are, inter alia, that the cooling air cooler according to the invention constitutes a simple and reliable system and leads to high efficiency of the plant as a whole. The helix steam generator works on the principle of the single-tube evaporator which is distinguished by a simple design in terms of apparatus and by correspondingly reliable operation. The principle of upward evaporation in continuously rising tubes allows the evaporator to operate in a stable manner, even in the case of very low cooling capacities. The spirally wound tubes permit a space-saving utilization of the pressure vessel which has a cylindrical shape on account of the high air pressure. Since the air flows on the tubes transversely, highly effective heat exchange occurs.

The result of the deflection of the air at the lowest point in the pressure vessel after it has flowed through the bundle is that water escaping in the event of a tube fracture accumulates at the lowest point of the pressure vessel as a result of the centrifugal forces and can be detected there, for example by a simple measurement of electrical conductivity.

It is advantageous here, in the cooling air cooler, that the inflow conduit for the compressed air opens into the lower part of the inner jacket tube which itself, in the upper part, opens into a collecting space delimited by an inner wall of the pressure vessel, and if the outer jacket tube and the outer wall of the pressure vessel delimit an annular space which is connected to the outflow conduit for the cooling air flowing out of the pressure vessel, said outflow conduit being arranged in the upper region of the cooling air cooler. The cooled air thus flows in the annular gap between the pressure shell and the outer jacket tube to the air outflow in the upper region of the cooler. In this way, the deflection of the cooling air can be brought about in a particularly simple way and the wall thickness of the pressure shell can be designed for the lower air temperature.

It is advantageous, furthermore, if the steam produced in the cooling air cooler is introduced into the superheater of the waste-heat steam generator, or if the cooler is used directly for the production of fresh steam, that is to say the steam produced in the cooling air cooler is introduced directly into the fresh steam conduit. The last version is particularly suitable when parameters of the gas turbine are increased further. Moreover, it is also possible to guide the steam produced in the cooling air cooler into the gas turbine or the combustion chamber.

The central advantage of the invention is that the cooling capacity is used for the production of steam, the energy of which can be optimally utilized as a result of expansion in the steam turbine.

It is particularly expedient if water injection is additionally incorporated in the inner jacket tube. This version allows the combination plant to operate optimally in the bypass mode. In the bypass mode of the plant, the exhaust gases from the gas turbine are guided past the waste-heat boiler directly into the stack, so that no consumer for the steam is available. The feedwater can then be routed selectively via a valve into the helix steam generator or via a valve and water injection into the airstream. The air cooling can thereby be adapted to the respective operating state. Mixed operation is also possible.

It is advantageous, furthermore, if, to make the bypass mode possible, a device for the injection of steam is arranged in the cooling air conduit between the cooler and the gas turbine, by which device at least some of the steam produced in the cooler can be supplied to the gas turbine. The increased volume flow then leads to a slightly increased power, so that at least some of the cooling capacity is put to profitable use.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, which show exemplary embodiments of the invention and wherein.

Only the elements essential for understanding the invention are shown. The direction of flow of the working media is designated by arrows.

DESCRIPTION OF THE PREFERRED EMBODIMENTS

Figure 1:
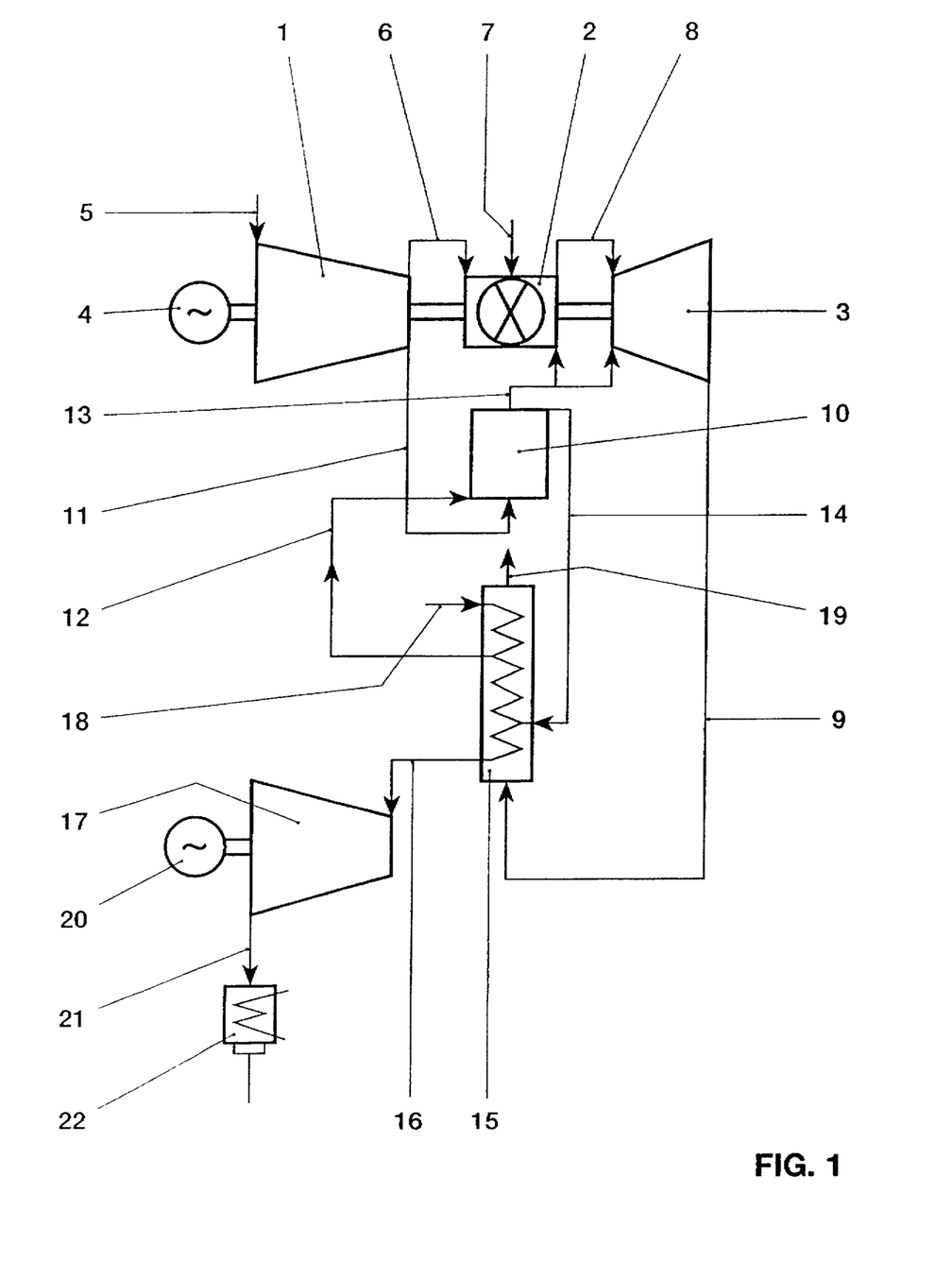
FIG. 1 shows a combined gas/steam turbine group with an integrated helix cooling air cooler.

Referring now to the drawings, wherein like reference numerals designate identical or corresponding parts throughout the several views, FIG. 1 shows a combination plant with a gas and steam turbine group. The gas turbine group consists of a compressor 1, of a downstream combustion chamber 2 and of a turbine 3 arranged downstream of the combustion chamber 2. Coupled to the gas turbine 3 is a generator 4 which ensures current generation.

The air 5 sucked in by the compressor 1 is guided, after compression, as compressed air 6 into the combustion chamber 2 and is mixed there with injected liquid and/or gaseous fuel 7 and the fuel/air mixture is burnt. The hot gases 8 produced by the combustion chamber 2 subsequently charge the gas turbine 3. The exhaust gas 9 from the gas turbine 3 is used thereafter in a downstream steam circuit.

Since the heat load on the combustion chamber 2 and on the turbine 3 is very high, the cooling of the thermally loaded assemblies must be as effective as possible. This is carried out by means of the cooling air cooler 10 which is a helix steam generator and which is described in more detail later in the following FIGS. 2 to 5.

A part quantity of compressed air 11, which is already heated up considerably, flows through the cooling air cooler 10, said part quantity being recovered from the compressor 1. The heat exchange within the cooling air cooler 10 takes place with the water stream 12 flowing through the tubes of the helix steam generator.

The compressed air 11 is therefore cooled on one side to such an extent that it is subsequently guided as cooling air 13 into the assemblies to be cooled. FIG. 1 shows the high-pressure cooler as an example. It recovers fully compressed air 11 at the outlet of the compressor 1, and its cooling air 13 is used for the cooling of assemblies in the combustion chamber 2 and in the highest pressure stage of the gas turbine 3. Alternatively to this, air of lower pressure can also be recovered from an intermediate stage of the compressor 1, said intermediate stage being used for cooling purposes in the corresponding pressure stage of the gas turbine 3.

On the other side, the water 12 is heated in the cooling air cooler 10 to such an extent that it evaporates. This steam 14 is then guided, according to FIG. 1, into the superheater part of the waste-heat steam generator 15, increases the steam fraction 16 which loads the steam turbine 17, and thus serves for improving the efficiency of the plant as a whole. When the power plant is operating normally in this way, the energy of the steam 14 generated in the cooling air cooler 10 is thus utilized optimally. It is also possible to admix the steam 14 directly with the fresh steam 16 or guide it to the combustion chamber 2 or to the gas turbine 3.

The exhaust gases 9 from the gas turbine 3, which still have a high heat potential, flow through the waste-heat steam generator 15. By means of a heat exchange process, these exhaust gases convert the feedwater 18 entering the waste-heat steam generator 15 into steam 16 which then forms the working medium of the remaining steam circuit. The exhaust gases, the heat potential of which has been utilized, subsequently flow into the open as flue gases 19. The energy coming from the steam turbine 17 is converted into current via a coupled generator 20. FIG. 1 shows a multi-shaft arrangement as an example. Of course, single-shaft arrangements, in which the gas turbine 3 and steam turbine 17 run on one shaft and drive the same generator, can also be selected. The expanded steam 21 from the steam turbine 17 is condensed in a water-cooled or air-cooled condenser 22. The condensate is then pumped by means of a pump, not shown here, into a feedwater tank and deaerator arranged downstream of the condenser 22 and not shown here. The water 18 is subsequently pumped via a further pump into the waste-heat steam generator 15 to form a new circuit or some 12 of the water is supplied to the cooling air cooler 10 via a regulating valve not shown here.

FIGS. 2 to 5 show various versions of the. cooling air cooler 10 which is designed as a helix heat exchanger on the countercurrent principle.

Figure 2:
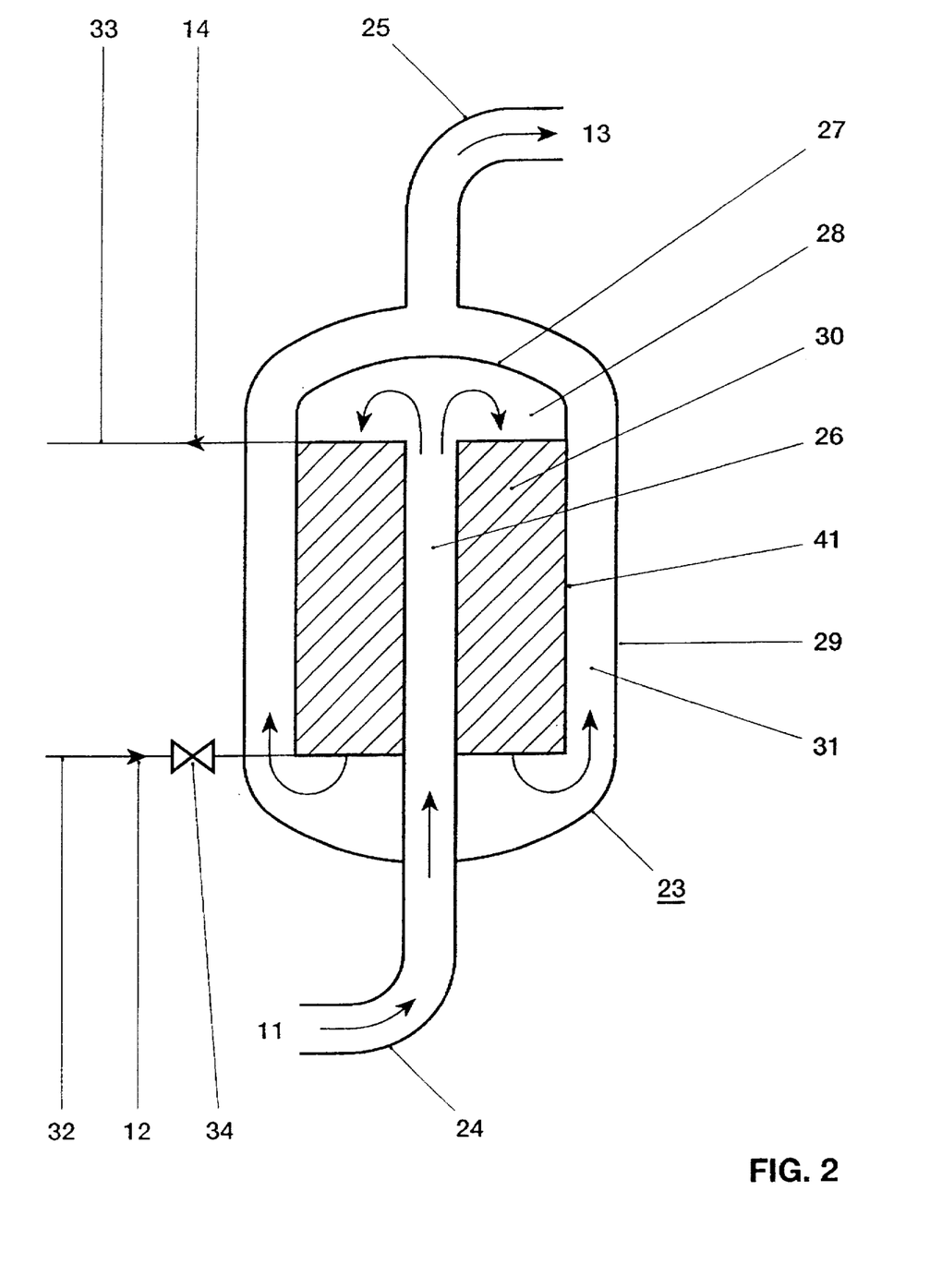
FIG. 2 shows a longitudinal section of the cooling air cooler according to the invention with an upper air outflow.

According to FIG. 2, the cooling air cooler 10 according to the invention consists of a vertically arranged cylindrical pressure vessel 23, into which an inflow conduit 24 for the air 11 coming from the compressor opens centrally on the bottom of said pressure vessel and from which an outflow conduit 25 for the cooling air 13 branches off likewise centrally at the upper end. In this case, the position of the air outflow is unimportant for the mode of operation. The air outflow conduit 25 can also be arranged laterally, specifically both in the upper and in the lower region of the pressure vessel 23 (see FIG. 5). The inflow conduit 24 is directly connected, inside the heat exchanger, to the centrally extending vertical inner jacket tube 26 of the helix steam generator. The inner jacket tube 26 opens at its upper end into a collecting space 28 delimited by an inner wall 27. The outer wall 29 of the pressure vessel 23 and the outer jacket tube 41, which is formed by the spirally coiled tubes 30 of the heat exchanger, form an annular space 31. A conduit 32 for the supply of water 12 opens into the tubes 30 at the bottom, whilst a conduit 33 for the discharge of steam 14 branches off at the top.

The mode of operation of the cooling air cooler 10 is as follows: compressed air 11, which is already heated up to a considerable extent, is recovered from the compressor 1. It flows via the conduit 24 into the inner jacket tube 26 of the cooling air cooler, flows upward and experiences deflection in the collecting space 28. The air 11 then flows from the top downwards, whilst the water 12, supplied via the conduit 32 and a pump, not shown, and metered via a regulating valve 34, flows upward in the tubes 30. The heat exchange taking place there on the countercurrent principle results, on the one hand, in the compressed hot air 11 being cooled and, on the other hand, in the water 12 in the tubes 30 being heated to such. an extent that it evaporates. This steam 14 is guided via the conduit 33, for example, into the superheater part of the waste-heat steam generator 15, increases the steam fraction 16 which loads the steam turbine 17, and thus serves for improving the efficiency of the plant as a whole. The cooling air flowing downward in the cooling air cooler 10 experiences deflection at the lowest point and flows in the annular space 31 upward to the outflow of the pressure vessel 23, from where it then flows as cooling air 13 via the conduit 25 to the assembly to be cooled in the power plant, for example in the gas turbine. By virtue of the deflection of the air 13 at the lowest point in the pressure vessel, water possibly contained in the air 13 can collect on the bottom of the pressure vessel 23 and be detected there relatively simply by measurement.

The advantages of this design are that the heat is utilized for steam production at high temperature, upward evaporation is employed and an evaporator without valves, pumps, separators or the like is used. The system is consequently simple and reliable and the efficiency of the plant as a whole is high.

Figure 3:
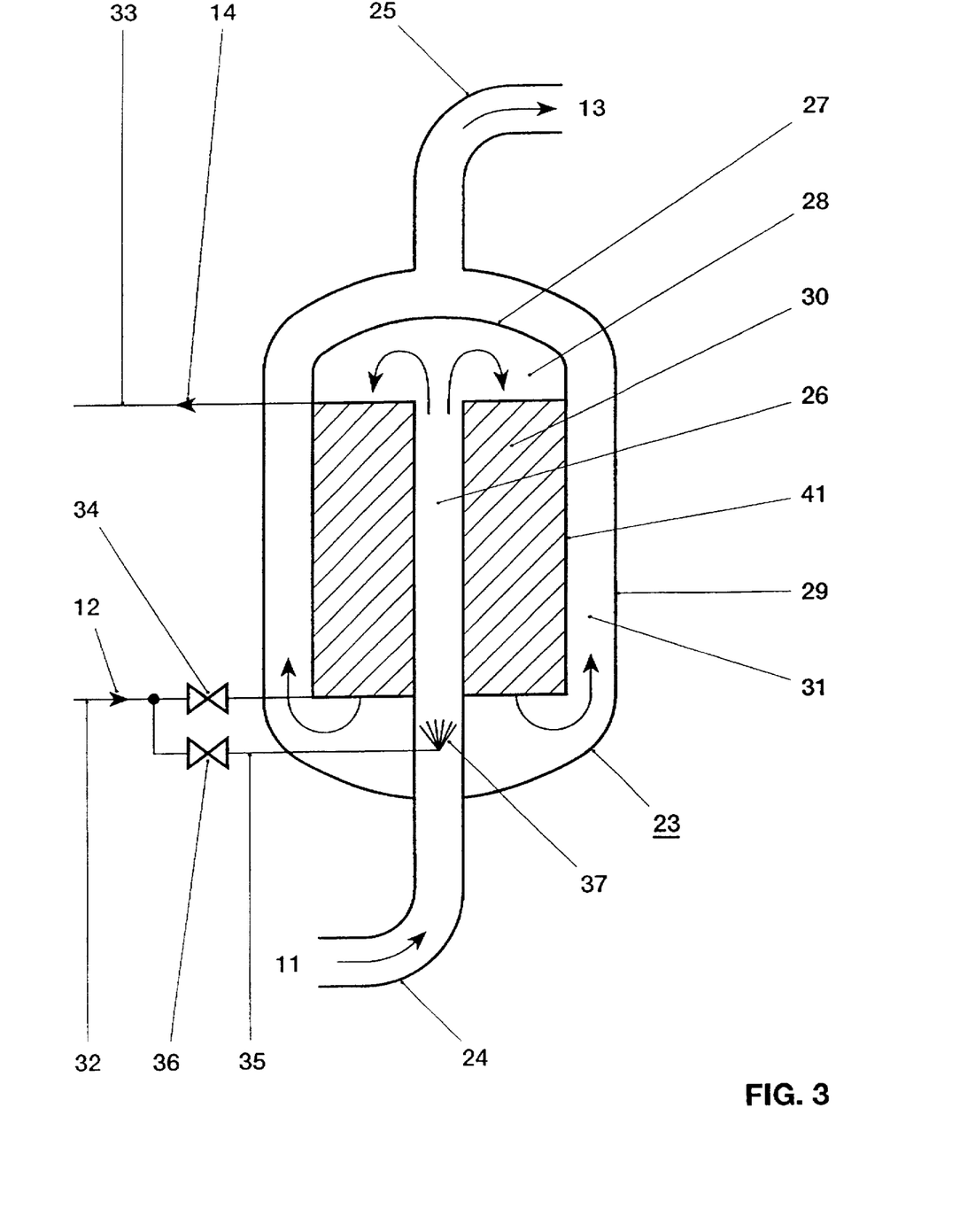
FIG. 3 shows a longitudinal section of the cooling air cooler according to the invention with water injection.

A further exemplary embodiment is shown in FIG. 3. This exemplary embodiment is usable particularly for the bypass mode of the power plant when the capacity of the cooler is not sufficient. It differs from the exemplary embodiment according to FIG. 2 in that a conduit 35 branches off from the water conduit 32, the water flow quantity in the conduit 35 being regulated by a regulating valve 36. Water 12 can be injected here into the hot air 11 via a nozzle 37. Water injection is used primarily for the cover of a peak load which seldom arises. As a result of the injection of water 12, the pressure is increased and only a small gas-side pressure drop therefore occurs. Air cooling can be carried out selectively by water injection or by means of the helix heat exchanger or mixed operation is also possible.

Figure 4:
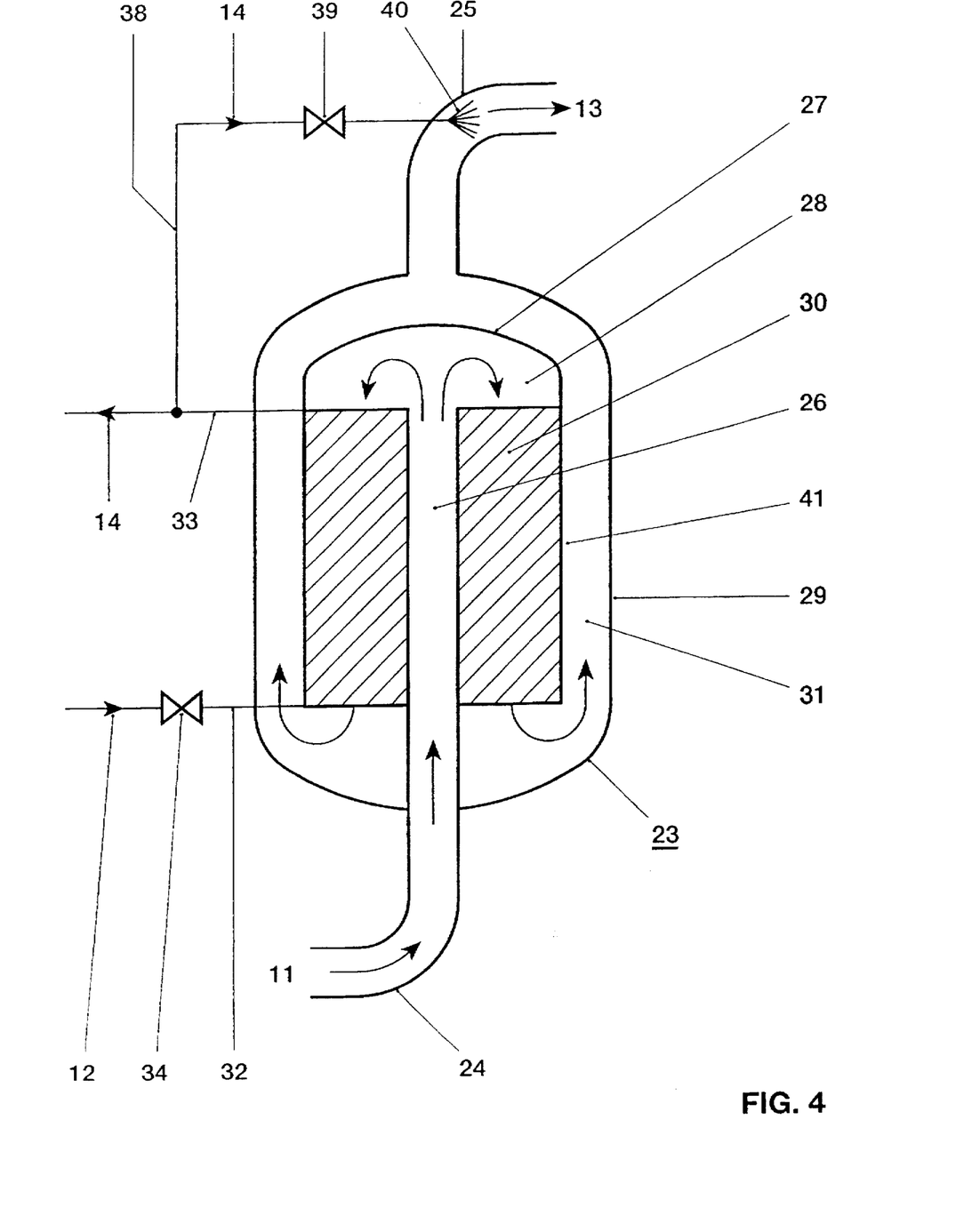
FIG. 4 shows a longitudinal section of the cooling air cooler according to the invention with steam injection into the cooling air.

FIG. 4 shows a version, in which, in comparison with the exemplary embodiment according to FIG. 2, additional steam injection into the cooled air 13 is carried out. In order to implement this, a conduit 38 branches off from the steam conduit 32 and opens by means of a nozzle 37 into the outflow conduit 25 for the cooling air 13 flowing out of the pressure vessel 23. The quantity of steam 14 flowing via the conduit 38 is regulated via a regulating valve 39. This version is suitable particularly for the operating situations which occur in the bypass mode of the plant and in which the air-side pressure drop of the cooler 10 becomes too great.

Some of the steam 14 produced in the cooler 10 can then be injected at high velocity into the cooling air conduit 25 via the valve 39. The momentum leads to an increase in the air pressure, thus partially compensating the pressure drop across the cooler 10. Mixed operation is possible.

Figure 5:
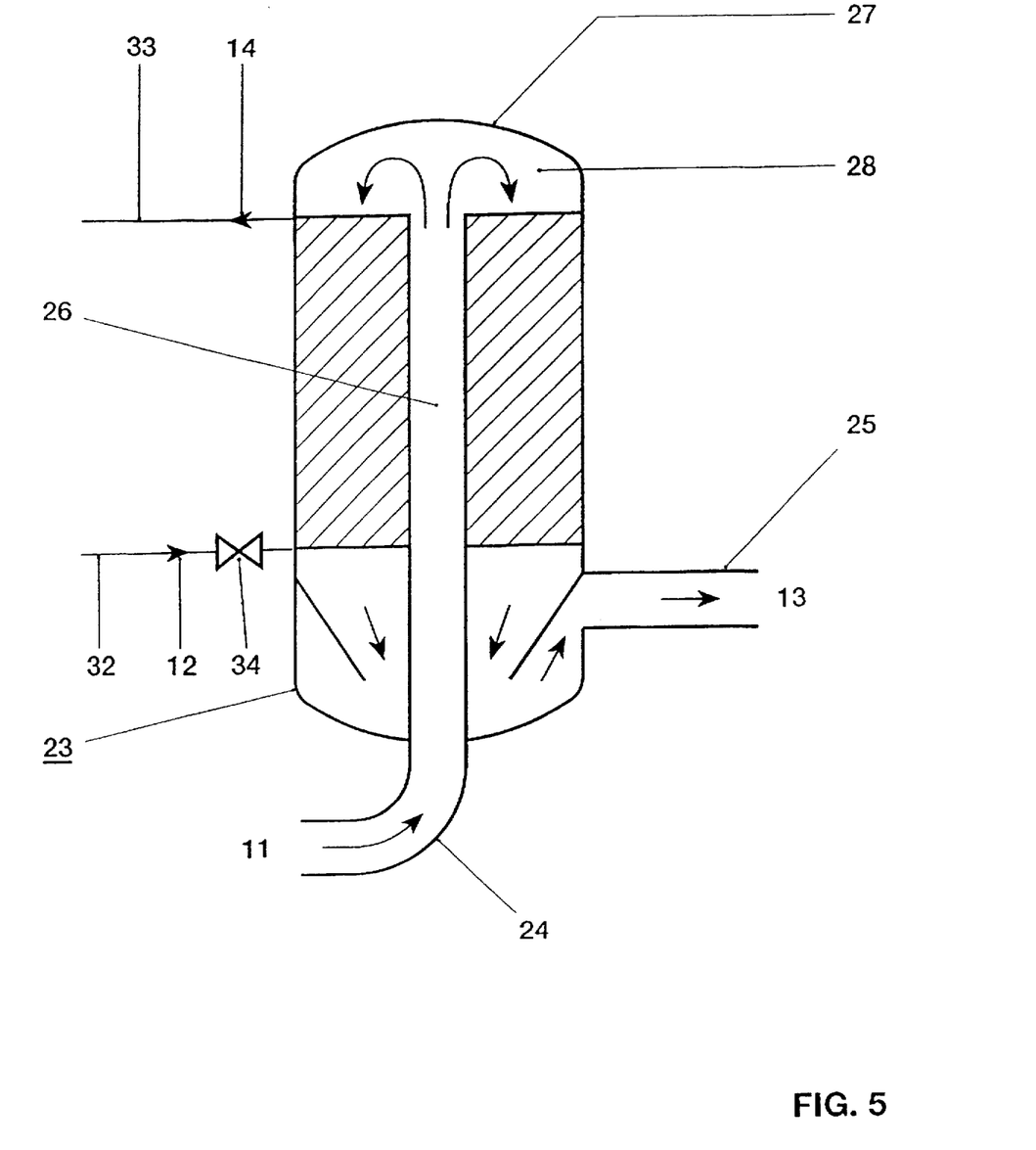
FIG. 5 shows a longitudinal section of the cooling air cooler according to the invention with a lower air outflow.
Figure 6:
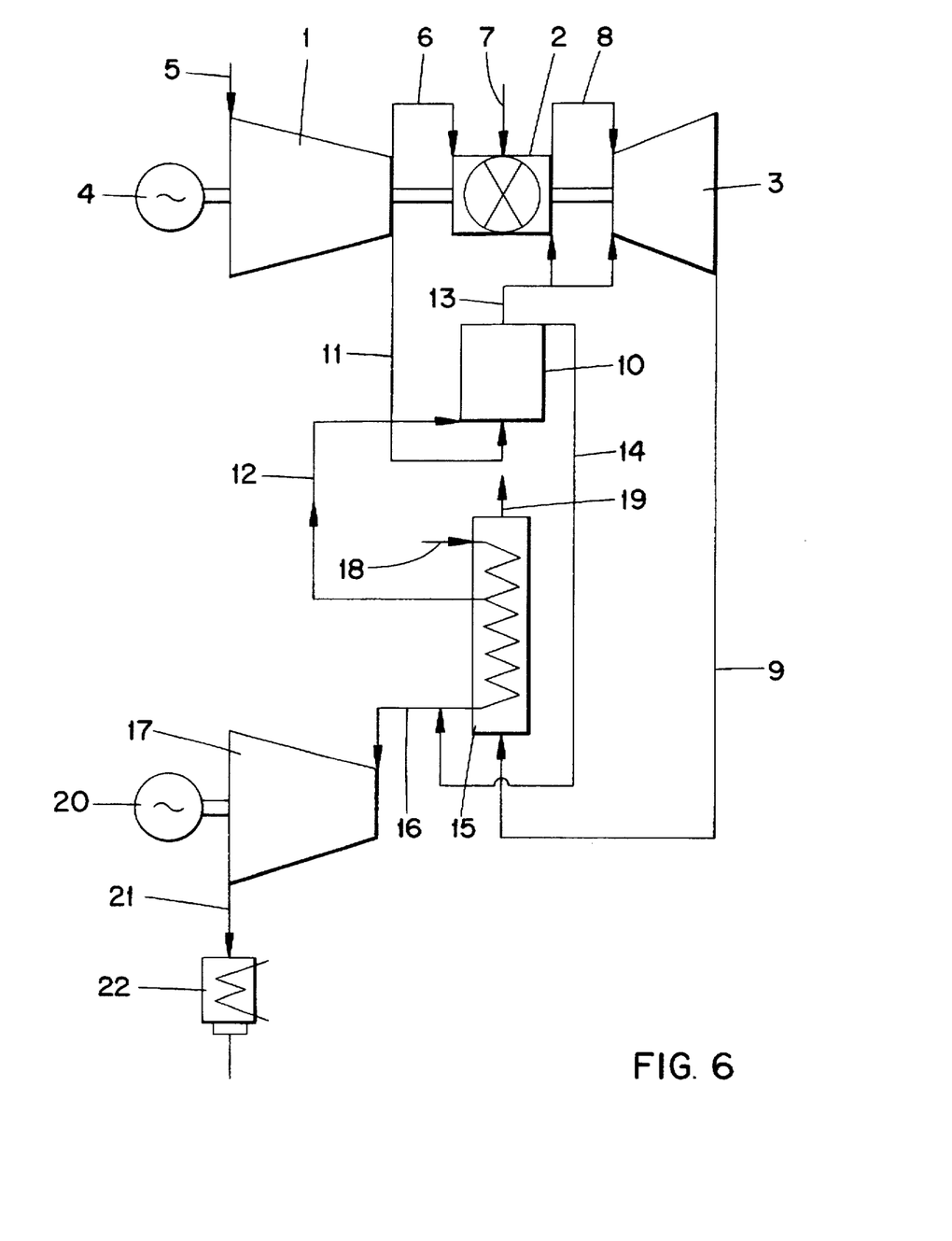
FIGS. 6–8 alternative steam flow paths.
Figure 7:
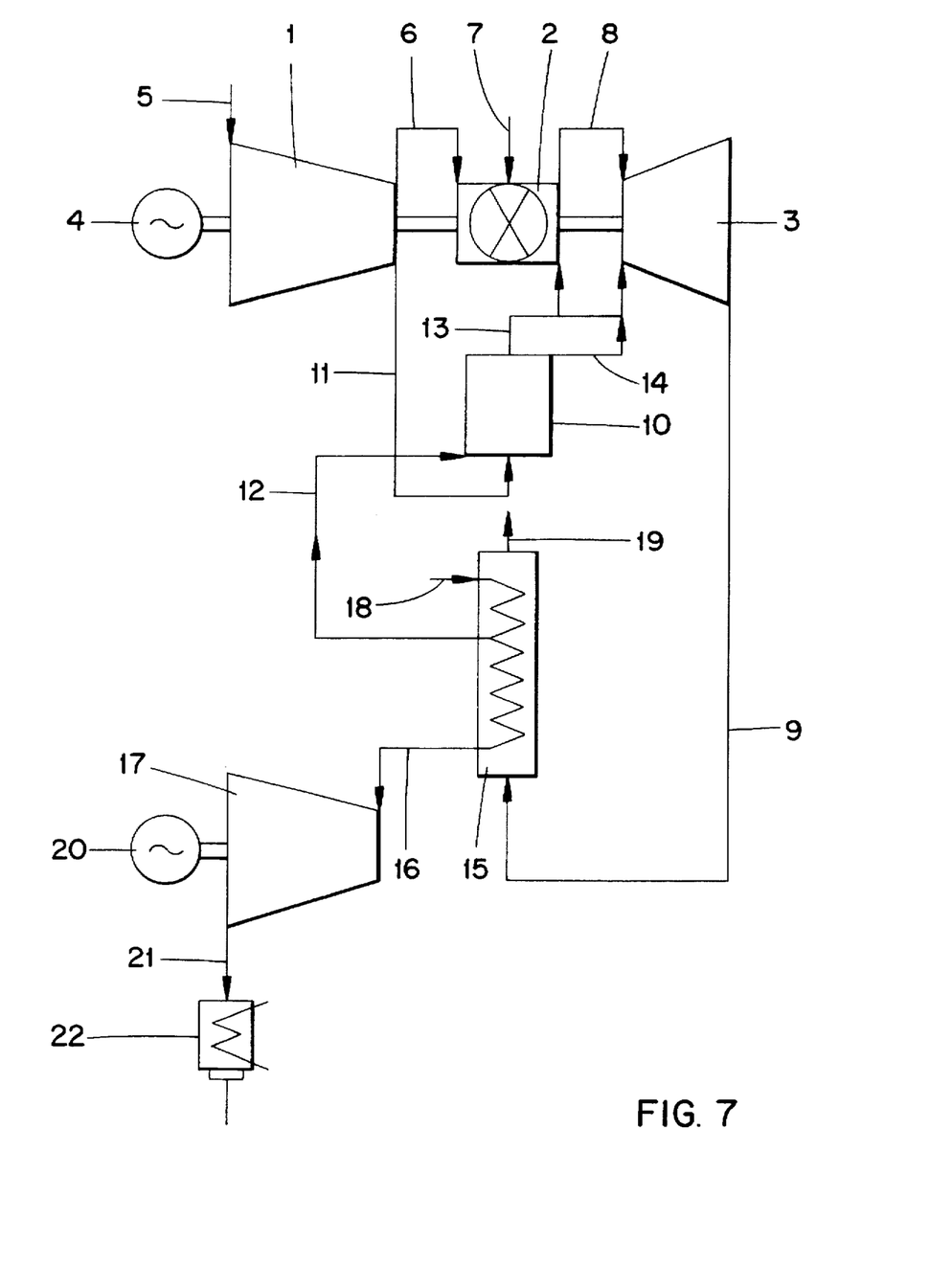
Figure 8:
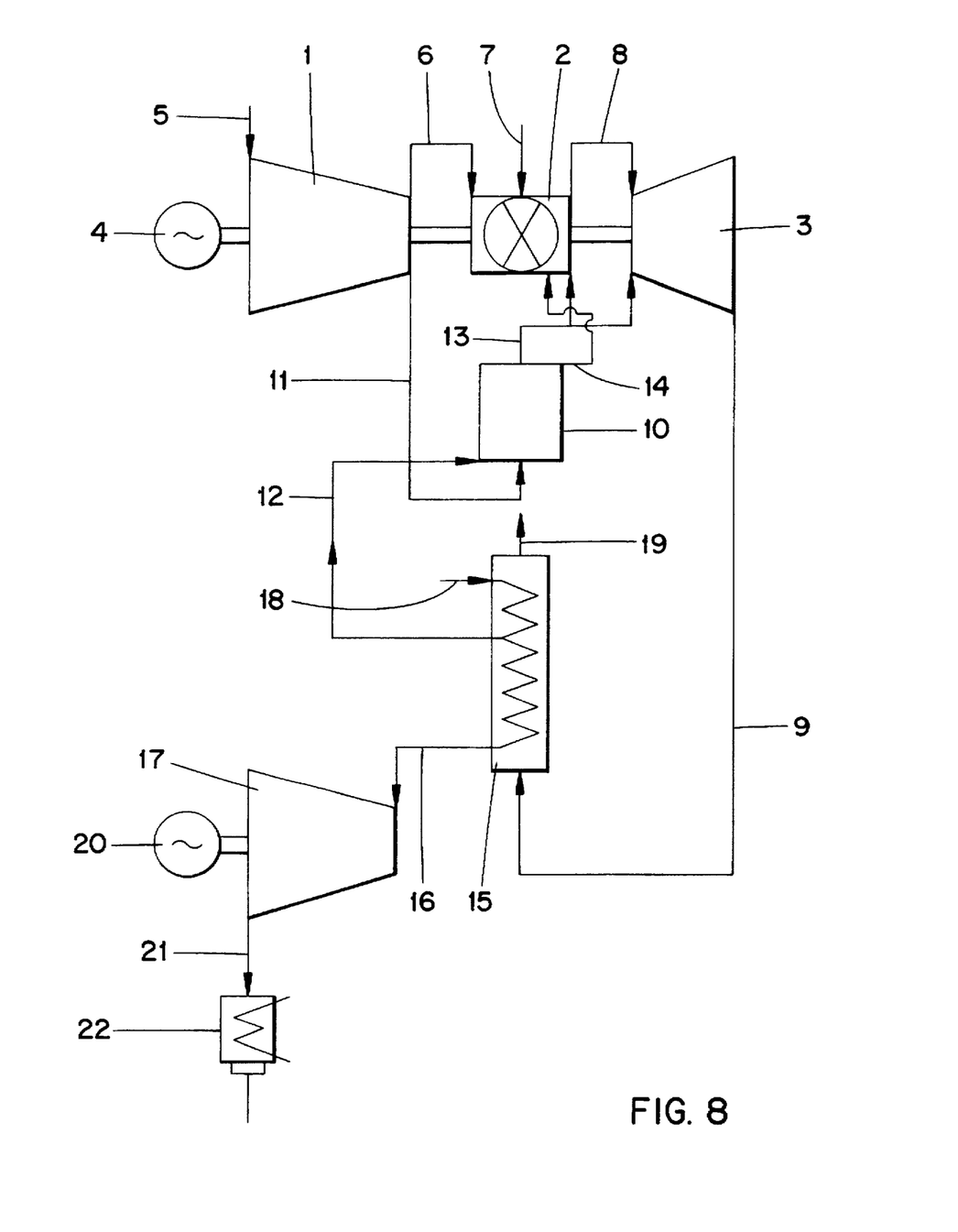

FIG. 5 shows a version of the cooling air cooler 10 according to the invention in which the necessary deflection of the cooling air 13 after it has flowed through the helix bundle is brought about by means of an air outflow in the lower region of the cooler, the air outflow conduit 25 branching off laterally. This results in a favorable arrangement of the air conduits in the plant, and the wall thickness of the pressure shell can, by the use of high-temperature steels and on account of the smaller diameter of the cylindrical pressure vessel 23, be reduced to such an extent that the version with the lower air outflow (see FIG. 5), despite the hotter pressure vessel, becomes less expensive than, for example, the version shown in FIG. 2 with the air outflow in the upper region of the cooler.

The cooling air cooler according to the invention can be used in the operating range between 5 and 100% cooling capacity and is suitable not only for combination power stations, but also for the single cycle of a gas turbine plant.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A cooling air cooler in combination with a power plant comprising a compressor, said cooling air cooler comprising a pressure vessel including a top, a bottom, and an air outlet located away from said bottom, an outer jacket tube within said pressure vessel, an inner jacket tube within said pressure vessel and said outer jacket tube, a space defined between said inner and outer jacket tubes, a helix steam generator vertically arranged in said pressure vessel, said helix steam generator comprising at least one spirally coiled tube which fills said space between said inner and said outer jacket tubes, said at least one spirally coiled tube including a fluid inlet and a fluid outlet, a water inflow conduit in fluid communication with said at least one spirally coiled tube through said fluid inlet for supplying water to said at least one spirally coiled tube, a steam outflow conduit in fluid communication with said at least one spirally coiled tube through said fluid outlet for discharging steam from said at least one spirally coiled tube, said fluid outlet positioned vertically above said fluid inlet, and an air supply conduit in fluid communication between said compressor and a portion of said space adjacent said fluid outlet, whereby when water is supplied through said water inflow conduit to said at least one spirally coiled tube, and when air is supplied from said compressor through said air supply conduit to said space, said water flows upwardly through said at least one spirally coiled tube and said air flows downwardly around said at least one spirally coiled tube and through said space, said water and said air are in counterflow, and said air is deflected at said bottom of said pressure vessel after exiting said space and before exiting said pressure vessel through said air outlet.

2. The cooling air cooler as claimed in claim 1, further comprising a device for steam injection arranged in said air outlet.

3. The cooling air cooler as claimed in claim 1, wherein said air supply conduit opens into a lower part of said inner jacket tube, and further comprising a device for water injection arranged in said air supply conduit.

4. The cooling air cooler as claimed in claim 1, wherein said pressure vessel further comprises an outer wall and an inner wall which delimits a collecting space, said air supply conduit opens into a lower part of said inner jacket tube which itself opens into said collecting space, and wherein said outer jacket tube and said outer wall of said pressure vessel delimit an annular space which is in fluid communication with said air outlet, said air outlet being arranged in an upper region of said cooling air cooler.

5. The cooling air cooler as claimed in claim 1, wherein said power plant further comprises a waste-heat generator which includes a superheater, and said steam outflow conduit is in fluid communication with said superheater, whereby when water is supplied through said water inflow conduit, steam produced in the cooling air cooler is supplied into said superheater.

6. The cooling air cooler as claimed in claim 1, wherein said power plant further comprises a waste-heat generator which includes a superheater including a fresh steam outlet, and said steam outflow conduit is in fluid communication with said fresh steam outlet, whereby when water is supplied through said water inflow conduit, steam produced in said cooling air cooler is supplied directly into said fresh steam outlet.

7. The cooling air cooler as claimed in claim 1, wherein said power plant further comprises a gas turbine and said steam outflow conduit is in fluid communication with said gas turbine, whereby when water is supplied through said water inflow conduit, steam produced in said cooling air cooler is supplied to said gas turbine.

8. The cooling air cooler as claimed in claim 1, wherein said power plant further comprises a combustion chamber and said steam outflow conduit is in fluid communication with said combustion chamber, whereby when water is supplied through said water inflow conduit, steam produced in said cooling air cooler is supplied to said combustion chamber.

* * * * *